United States Patent
Calcev et al.

(10) Patent No.: US 10,230,448 B2
(45) Date of Patent: Mar. 12, 2019

(54) SYSTEM AND METHOD FOR ROBUST RELAY COMMUNICATION

(71) Applicant: Futurewei Technologies, Inc., Plano, TX (US)

(72) Inventors: George Calcev, Hoffman Estates, IL (US); Majid Ghanbarinejad, Rolling Meadows, IL (US); Diana Maamari, Rolling Meadows, IL (US)

(73) Assignee: Futurewei Technologies, Inc., Plano, TX (US)

( * ) Notice: Subject to any disclaimer, the term of this patent is extended or adjusted under 35 U.S.C. 154(b) by 238 days.

(21) Appl. No.: 15/222,907

(22) Filed: Jul. 28, 2016

(65) Prior Publication Data

US 2017/0033858 A1 Feb. 2, 2017

Related U.S. Application Data

(60) Provisional application No. 62/198,509, filed on Jul. 29, 2015.

(51) Int. Cl.
| | |
|---|---|
| *H04J 1/00* | (2006.01) |
| *H04B 7/14* | (2006.01) |
| *H04W 24/10* | (2009.01) |
| *H04W 24/04* | (2009.01) |

(52) U.S. Cl.
CPC ............... *H04B 7/14* (2013.01); *H04W 24/04* (2013.01); *H04W 24/10* (2013.01)

(58) Field of Classification Search
CPC ......... H04B 7/14; H04W 24/04; H04W 24/10
USPC ....................................................... 370/315
See application file for complete search history.

(56) References Cited

U.S. PATENT DOCUMENTS

| | | | | |
|---|---|---|---|---|
| 9,125,179 | B2* | 9/2015 | Seok ..................... | H04W 76/02 |
| 2012/0320763 | A1* | 12/2012 | Hong ................... | H04B 5/0081 |
| | | | | 370/246 |
| 2013/0064173 | A1* | 3/2013 | Sivavakeesar ..... | H04B 7/15557 |
| | | | | 370/315 |
| 2015/0341107 | A1* | 11/2015 | Hong ................... | H04B 5/0081 |
| | | | | 370/246 |
| 2015/0358067 | A1* | 12/2015 | Zhang ................. | H04W 40/244 |
| | | | | 370/315 |

FOREIGN PATENT DOCUMENTS

| | | |
|---|---|---|
| CN | 101141409 A | 3/2008 |
| CN | 101754263 A | 6/2010 |
| EP | 2012484 A1 | 1/2009 |
| EP | 2237611 A1 | 10/2010 |
| WO | 2012070049 A1 | 5/2012 |

OTHER PUBLICATIONS

Search report issued in corresponding PCT application No. PCT/CN2016/092331, dated Jul. 29, 2016, total 4 pages.

* cited by examiner

*Primary Examiner* — Chuong T Ho
(74) *Attorney, Agent, or Firm* — Slater Matsil, LLP

(57) ABSTRACT

A method and apparatus for wireless communications for relay communication are provided. The method includes a source node sets up one or more backup relay links between the source node and a destination node that comprises a route through one or more standby relay nodes; transmits a first frame to the one or more standby relay nodes to activate the one or more standby relay nodes, transmits a second frame from the source node to the destination node informing the destination node of a switch of the relay link. Apparatuses are provided thereof.

27 Claims, 4 Drawing Sheets ial layer using broad-beam antennas with high pathloss resistance and a data layer with narrow-beam antennas that are particularly sensitive to blockage.

SYSTEM AND METHOD FOR ROBUST RELAY COMMUNICATION

This application claims the benefit of U.S. Provisional Application No. 62/198,509, filed on Jul. 29, 2015, entitled "System and Method for Robust Relay Communication" which application is hereby incorporated herein by reference.

TECHNICAL FIELD

The present invention relates to a system and method for wireless communications, and, in particular embodiments, to a system and method for wireless relay communication.

BACKGROUND

Millimeter wave communication generally corresponds to wireless communication that uses the radio spectrum between 30 GHz to 300 GHz, with a wavelength between one and ten millimeters. However, in the context of wireless communication, the term also can more specifically correspond to a few bands of spectrum near 38, 60 and 94 GHz, and more recently to a band between 70 GHz and 90 GHz (also referred to as E-Band).

Millimeter-wave (mmWave) communications may be characterized by the usage of directional antennas that offers increased antenna gain and spatial separation. While directional communications offer additional gain that compensates for the large pathloss experienced in mmWave communications, line-of-sight (LOS) blockage remains one of the main factors for disruption of communications.

SUMMARY

An embodiment method for relay communication includes setting up, by a source node, one or more backup relay links between the source node and a destination node that comprises a route through one or more standby relay nodes; transmitting a first frame, by the source node, to the one or more standby relay nodes to activate the one or more standby relay nodes, wherein the first frame comprises one or more addresses for each of the one or more standby relay nodes, an order in which the one or more standby relay nodes are to be used for the relay communication, and instructions for the one or more standby relay nodes to become one or more active relay nodes; transmitting a second frame from the source node to the destination node informing the destination node of a switch of the relay link, wherein the second frame comprises one or more addresses of the one or more active relay nodes for the destination node to communicate with; establishing, by the source node, a communication path to the destination node using the one or more active relay nodes.

An apparatus for relay communication includes a memory that stores one or more backup relay links between a source node and a destination node that comprises a route through one or more standby relay nodes; a transmitter that transmits a first frame to the one or more standby relay nodes to activate the one or more standby relay nodes that comprises one or more addresses for each of the one or more standby relay nodes, an order in which the one or more standby relay nodes are to be used for the relay communication, and instructions for the one or more standby relay nodes to become one or more active relay nodes and that transmits a second frame from the source node to the destination node informing the destination node of a switch of the relay link, wherein the second frame comprises one or more addresses of the one or more active relay nodes for the destination node to communicate with; and a processor that is used to establish a communication path to the destination node using the one or more active relay nodes.

BRIEF DESCRIPTION OF THE DRAWINGS

For a more complete understanding of the present disclosure, and the advantages thereof, reference is now made to the following figures taken in conjunction with the accompanying description, in which.

DETAILED DESCRIPTION OF ILLUSTRATIVE EMBODIMENTS

Figure 1A:
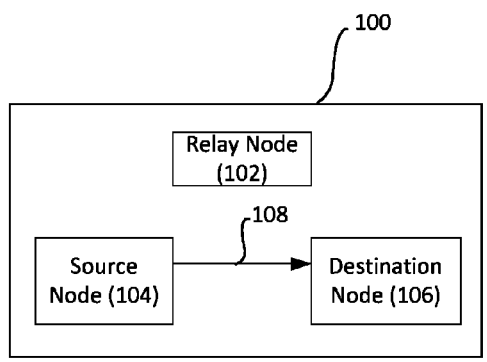
FIGS. 1A and 1B illustrate a link switching relay according to one embodiment of the disclosure.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Networks generally comprise a plurality of nodes used to communicate data from a source to a destination. In between the source and the destination nodes, relay nodes may be used to facilitate communication between the source and the destination node. The relay nodes enable the source and the destination to communicate through a relay node when direct communication between the source and the destination nodes is not available.

Relay nodes are able to provide a path for data to be communicated from the source to the destination. However, since relays may be in different locations or be subject to obstacles or interference, having multiple relays available is useful in maintaining communications. This is particularly important for high frequency communication where the pathloss is high and the communication has high directionality (narrow beamform) antennas. High directionality may have the meaning that the communication link is with narrow beamform antennas. Beamform may be used as a directional communication for a link.

Relay nodes are used in network to communicate data. However, the relays may fail due to obstacles or interference. Keeping multiple relays available is useful in maintaining communications but may require too much power. The operation of a plurality of relays is particularly important for high frequency communication where the pathloss is high and the communication has high directionality antennas.

One problem that is generally associated with the multiple relays is that keeping unnecessary relays active and capable of providing a communication path from a source to a destination requires too much power. Systems and methods that enable a plurality of relays to be available to provide a data pathway between a source and a destination while not drawing too much power are needed. In order to address this need, the present disclosure contemplates various embodiments to use multiple relay paths with one or node nodes that can be placed into a sleep or low power mode and used in mmWave communication (60 GHz) with high directional antennas.

For the purpose of clarity, the term node is intended to include, but not be limited to, any device capable of sending or receiving data. An example of a node could be a user equipment (UE) such as a cellular telephone, a base station (BS), or any other device used to send or receiving data. A node may also be referred to as a relay-capable stations (STAs) which are capable of sending and receiving communication.

In addition, the phrase "backup relay links" is intended to include, but not be limited to, one or more nodes which are capable of communicating information from a source node to a destination node. Backup relay links may comprise one or more nodes.

Also, the phrase "relay node" may be referred to as any node that is used facilitate the sending or reception of data from one node to another node. The phrase "relay station" (SRS) may also be used to refer to a relay node.

Prior to relay communications, relay-capable stations (STAs) communicate their capabilities to the personal basic service set (PBSS) control point (PCP) or the access point (AP) through the Relay Capabilities element contained in management frames such as association request frames. Once the capabilities are known to the PCP/AP, a source STA that intends to establish a relay link to a destination STA performs relay discovery and relay link setup (RLS) procedures. The procedures include obtaining a list of available relay-capable STAs from the PCP/AP, performing link quality measurements with each relay-capable STA, and exchanging request/response frames between the source STA, the relay STA and the destination STA. Then, the relay STA participates in communications between the source STA and the destination STA in the service periods (SPs) scheduled by the PCP/AP.

Two types of relay operation are introduced a link switching type and a link cooperating type.

Figure 1B:
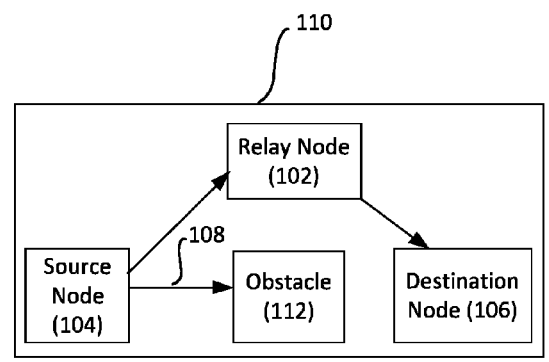
Figure 2A:
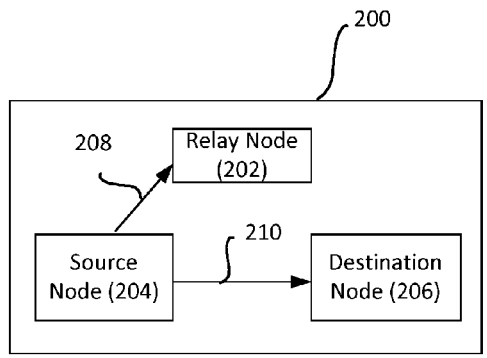
FIGS. 2A and 2B illustrate a link cooperating relay according to one embodiment of the disclosure.
Figure 2B:
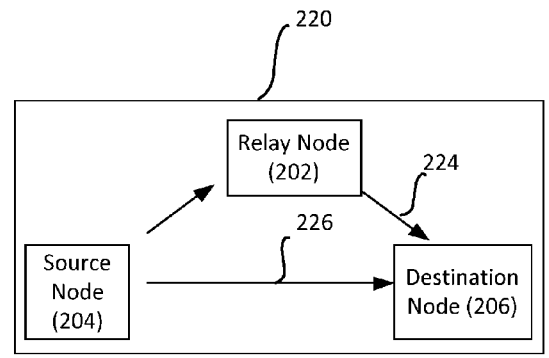

FIGS. 1A and 1B describe the link switching type. FIGS. 2A and 2B describe the link cooperating type. It is expressly understood that a network may utilized one, or a combination of more than one, relay operation types depending on the size and complexity of the network.

In the link switching type system 100 shown in FIG. 1A, the source node 104 communicates to the destination node 106 directly as long as the direct link 108 is available. The relay node 102 illustrated in the system 100 may not be active so long as the direct link 108 is available.

FIG. 1B illustrates what may happen if an obstacle 112 interrupts the direct link 108. If the direct link 108 is disrupted the source node 104 redirects the transmissions to the relay node 102. The relay node 102 then forwards the frames it has received to the destination node 106 through the relay node 102. In this way, communications between the source node 104 and destination node 106 may proceed without interruption.

In the example illustrated by FIG. 1B, the destination node 106 should be informed of this link switching and start listening to the relay node 102. It is contemplated that a specific protocol with an associated timeout timer is implemented by the nodes. A relay SP is divided into time slots of constant duration, called the Link Change Interval. If the direct-link communication is disrupted during a Link Change Interval, switching to the relay link occurs in the following Link Change Interval. Since the source node 104 should ensure that the destination node 106 is informed of such link switching so it can start listening to the relay node 102, the source node 104 waits for an additional time, called Data Sensing Time, which is a fraction of the Link Change Interval. If the destination node 106 does not receive an anticipated frame from the source node 104 for a period of Data Sensing Time from the beginning of a Link Change Interval, it switches to the relay node 102.

If the relay type is full-duplex amplify-and-forward (FD-AF), communications through the relay link follow similar timings as the direct link. However, if the relay type is half-duplex decode-and-forward (HD-DF), the relay link communications are divided into pairs of a First Period, when the source node 104 transmits frames to the relay node 102, and a Second Period, when the relay node 102 forwards the frames to the destination node 106. Values of the timing parameters include, but are not limited to, Link Change Interval, Data Sensing Time, First Period and Second Period and are communicated through the Relay Transfer Parameter set element contained in RLS frames.

FIGS. 2A and 2B illustrates a link cooperating relay example. The relay node 202 cooperates with the source node 204 to transmit frames to the destination node 206 in order to improve the received signal strength. The SP is divided into two periods: the First Period (T1) illustrated by FIG. 2A and the Second Period (T2) illustrated by FIG. 2B. In the First Period (T1), the source node 204 transmits the frames to the relay node 202 using data path 208 and transmits to the destination node 206 using data path 210. In the Second Period (T2), illustrated by FIG. 2B both the source 204 and the relay node 202 retransmit the same frame cooperatively to the destination node 206 using data paths 224 and 226. Since frame transmissions from the source node 204 and the relay 202 should be synchronized at the symbol level from the destination node 206 point of view, a procedure called transmission time point adjustment (TPA) is performed through which the source node 202, relay node 202, and destination node 206 exchange frames to learn about, and compensate for, the differences between source-destination and relay-destination propagation times.

In addition to the above relay communication types, which are collectively referred to as normal mode operation, an alternation mode is also introduced, where link switching between the direct link and the relay link occurs at the beginning of every Link Change Interval.

An approach of the alternation mode introduces several steps as follows.

The first step of the alternation mode is the relay capabilities discovery. This is where source directional multi-gigabit (DMG) node, here called the source node, learns the capabilities of the destination DMG node, here called the destination node, during association or via an Information Request/Response frame exchange.

The second step of the alternation mode is the relay search, where a source node discovers the existing relay nodes through a Relay Search Request/Response frame exchange.

The third step is the relay selection where the PCP/AP schedules SPs for each relay DMG node, here called a relay node, provided in Relay Search Response. Beamforming may be performed optionally. The source node sends a Channel Measurement Request to the relay node and receives a Channel Measurement Response.

The fourth step is the relay link setup procedure (RLS) where the source node sends an RLS Request frame to the relay node, which it forwards to the destination node. The destination node replies with an RLS Response frame. An RLS Response frame is, then, sent from the relay node to the source node. These frames contain the capabilities and the Relay Transfer Parameter set. The fifth step is the data transfer between the source node and the destination node through the relay node.

DMG stations may be stations that work in mmWave. Although various embodiments are described in a specific DMG station context, the embodiments are not so limiting. That is, the embodiments apply to frequency bands other than mmWave bands, and the embodiments apply to stations other than DMG stations.

Embodiments provide systems and methods for relay link setup for robust relay communication, to the disclosed materials have a plurality of embodiments enabling functionality that includes, but is not limited to, the following:

(1) Set up multiple backup relay links that operate in standby mode and could become active in short notice in order to increase link reliability and reduce link recovery delay.

(2) Reduce the power consumption at the relay. For example, a relay node that has established a relay link through the RLS procedure with a pair of endpoint nodes, namely, a source node and a destination node, listens to Extended Schedule elements sent by the PCP, or the AP, and stays awake during the SPs scheduled between the endpoint node pair. Note that a relay node may be called relay DMG node (RDS), and an endpoint node may be called relay endpoint DMG node (also referred to as a relay endpoint DMG STA, or REDS). This approach leads to additional energy consumption for the relay node if it is not needed for communication in particular SPs. This problem is more significant for the case of multiple relay links when the source node wants to explicitly inform standby relay nodes to participate in communication only when needed.

(3) Compensate for the clock drifts between nodes. Relay communication timings may be determined based on the starting point of the SP, which is subject to errors due to clock drifts.

(4) Extend the relay usage beyond SPs. Relay communication may be limited to SPs. Relay operation during contention-based access periods (CBAPs) may also be desired.

An embodiment provides a solution for fast relay replacement when the present relay link(s) fail. An embodiment provides a solution for extension of relay communication during the CBAP.

More precisely, an embodiment system and method extend the functionality of above described relay communication as follows. After completing the relay discovery procedure, the source node performs RLS procedures with multiple relay-capable nodes, which operate as standby relay nodes (also referred to as standby relay STA, or SRSs), and which are able to transfer data without running a relay link setup again.

In one embodiment, a single relay is used at a time, where a relay is replaced in case of link failure by a standby relay. While the Figures shown in 1A, 1B, 2A, and 2B only illustrate a single alternative path, it is understood that a plurality of relays may be present which operate in any of the relay communication types described above.

Figure 3:
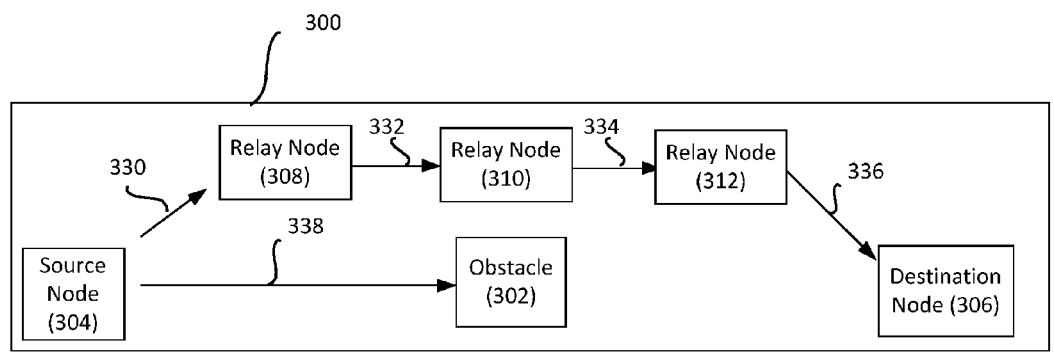
FIG. 3 illustrates an embodiment of multiple relays being used in series.

FIG. 3 illustrates an embodiment 300 where an obstacle 302 interrupts data transfer between the source node 304 and the destination node 306. In this embodiment, three relay nodes 308, 310, and 312 are used to convey data through data paths 330, 332, 336, and 336 from source node 304 to destination node 306. This example is intended to illustrate that a plurality of nodes may be used to form a relay link. The link illustrated in FIG. 3 is substantially similar in design to that of the link shown in FIG. 1B with the inclusion of a plurality of nodes.

Figure 4:
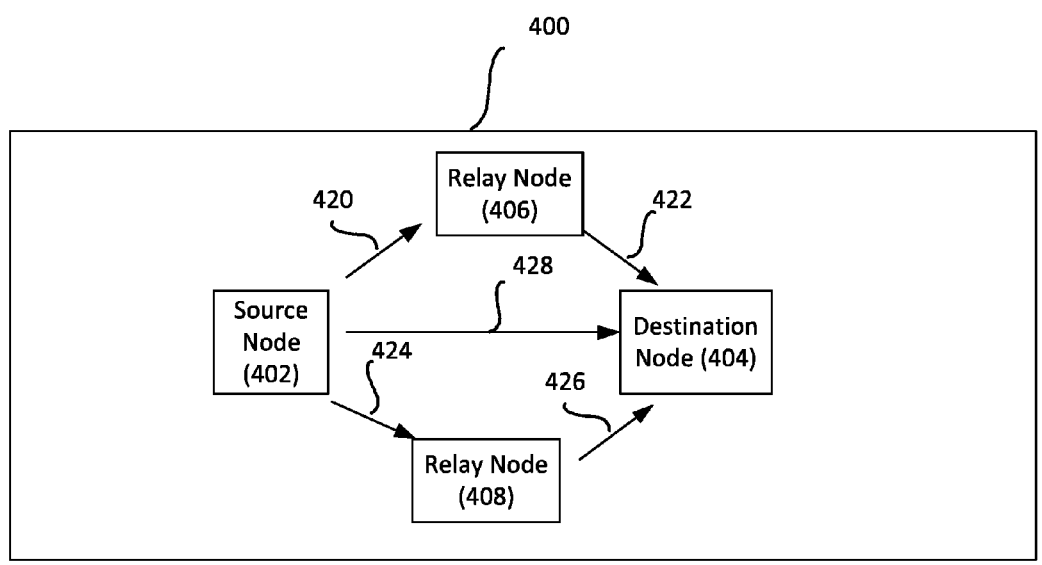
FIG. 4 illustrates an embodiment of multiple relays being used in parallel.

FIG. 4 illustrates an embodiment of multiple relays 406, 408 being used simultaneously. The source node 402 sends to a group of relay nodes 406, 408 the same data stream while the relay nodes 406, 408 simultaneously send the same data to the destination node 404. Specifically, source node 402 sends data to relay node 406 using communications path 420 and relay node 406 sends data to the destination node 404 using communications path 422. Source node 402 also sends data to relay node 408 using communications path 424 and relay node 408 sends the data to the destination node 404 using communications path 426. In some embodiments, as discussed in FIG. 2B, the source node 402 may also communicate directly to the destination node through communications path 428. It is understood that such same data stream sending may be done through a way of broadcast.

Figure 5:
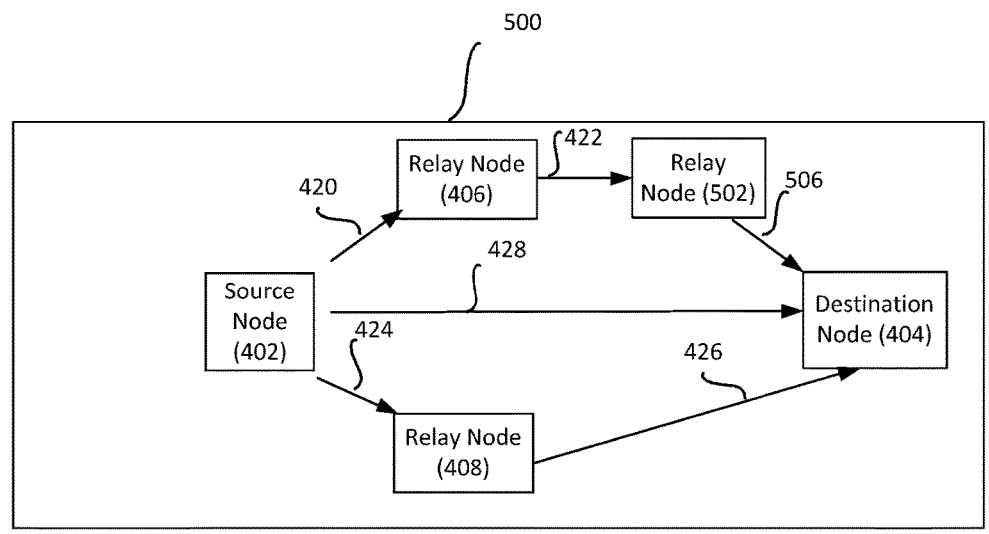
FIG. 5 illustrates an embodiment of multiple relays being used.

FIG. 5 is substantially similar to that of FIG. 4 with the inclusion of relay node 502 placed in between the relay node 406 and the destination node 404. Relay node 506 receives data through data path 422 from relay node 406 and conveys it to the destination node 404 through data path 506. It is expressly contemplated that the present disclosure is capable of looking at the network topology of various paths and seeking to optimize the power management of the network by only bring the minimum number of relay nodes into a transmission state that are needed to convey communications. In the example shown in FIG. 5, the single relay node 408 may require less power to transmit data from the source node to the destination node that would be required by activating both relay node 406 and relay node 502. In this way the power of the overall network may be optimized using the present disclosures awareness of the network topology and the activation of only those relay nodes required for communication.

In another embodiment, the source sends different data streams to different relays by using a multiuser technology such as downlink (DL) multiuser multiple-input multiple-output (MU-MIMO), or orthogonal frequency division multiple access (OFDMA), or beamforming, or a combination thereof. The relay nodes may simultaneously send different data streams to the destination node via a multiuser technology such as uplink (UL) MU-MIMO, or UL OFDMA, or beamforming, or a combination thereof.

Beamforming is a mechanism that is used by a pair of nodes to achieve the necessary DMG link budget for communication. Beamforming training is a bidirectional sequence of beamforming training frame transmissions that uses sector sweep and provides the necessary signaling to allow each node to determine appropriate antenna system settings for both transmission and reception. After the successful completion of beamforming training, breamforming is said to be established. A beamforming training frame may be a sector sweep (SSW) frame, a DMG Beacon frame or a beam refinement protocol (BRP) frame.

In an embodiment, the source node broadcasts a new type of frame, referred to herein as a Relay Communication Announcement (RCA) frame, to be received by the relay nodes and the destination node. The frame provides information about the all relay nodes that are called to participate in communications, the order in which the relay nodes will be used for communication if applicable, and the timing information. During an SP, if a relay node receives an RCA frame indicating that the relay node is not needed for communication in that SP, the relay node may decide to go into doze (sleep) mode for the rest of the SP in order to save battery power.

The RCA frame can be a control frame to be transmitted at a low rate, e.g., by using the Control modulation and coding scheme (MCS) defined in standard documents e.g. IEEE 802.11ad, which is incorporated by reference in its entirety as part of the application and referenced specifically within this disclosure. For example, the control frame is to be transmitted at a rate below that of a frame that is transmitted in the process of setting up a relay link.

When to send out the RCA frame or when the relay link is determined as fail and needs to be recovered, this could be determined if either a message e.g. at a lower rate, is received from the destination node, or when a timer expired with no messages being received from the relay node.

The frame is transmitted by the source node to trigger (or at) the start of relay communication: in an SP whose source node in the Extended Schedule element is the source node of the relay link, or in a transmission opportunity (TXOP), during a CBAP, whose TXOP holder is the source node of the relay link.

The frame contains multiple information fields, which include the following.

(1) The address of the destination node, which is the address of the destination node in the Extended Schedule element of an SP or the address of the TXOP responder in a TXOP. The addresses are, for instance, the association identifier (AID) or the shortened AID of the destination STA.

(2) A list of relay node addresses, for instance, a sorted list of AIDs or shortened AIDs of the relay nodes. In one embodiment, the source node starts the list of addresses with the last relay node through which it had successful communication with the destination node. The length of the relay node address list could be fixed, for example, to a maximum of four relay nodes, or it could be of variable length, indicated by a length field in the frame. In the latter case, an relay node address in the address list may appear multiple times allowing the node pair to reattempt communications through a particular relay node before communication through that relay node is assumed to be disrupted.

(3) An indication associated with each active relay entry in the list that specifies if the relay node is receiving simultaneously with other relay node (s) from the list and the mode of operation for instance broadcast, or DL MU-MIMO.

(4) An indication associated with each active relay node entry in the list that specifies if the relay node is transmitting simultaneously with other relay node (s) from the list and the mode of operation, for instance UL MU-MIMO.

(5) An element indicating if the listed SRSs shall retransmit the RCA frame in order to increase the probability of having a frame reach the destination node successfully. For instance, if this element is set to 1, it could imply that the listed SRSs shall relay the RCA frame, as for instance in the order they appear in the list, separated in time by a short inter-frame space (SIFS).

Figure 6:
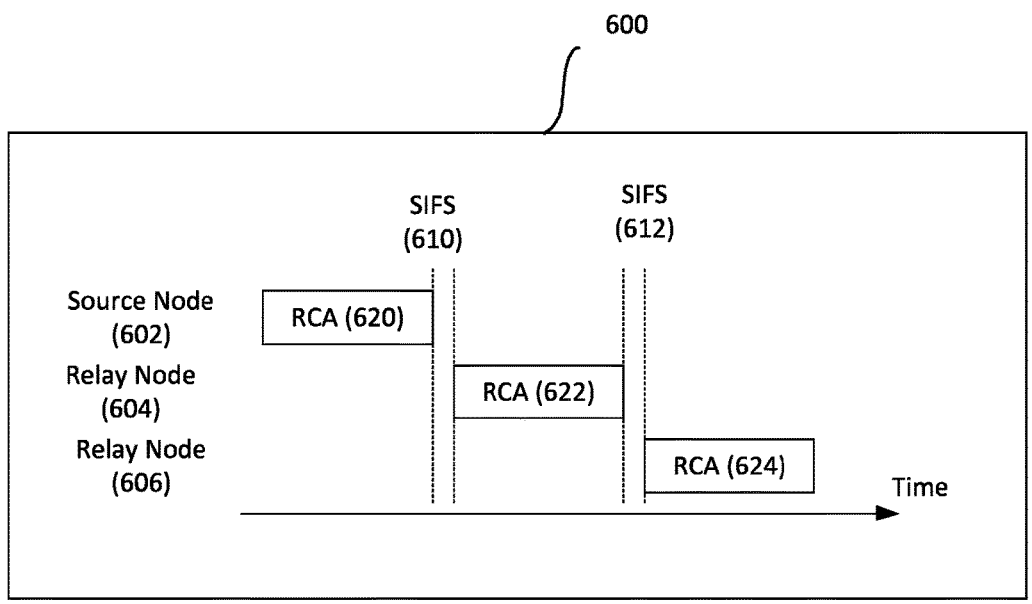
FIG. 6 illustrates an embodiment of a Relay Communication Announcement frame transmission by a source station and two standby relay stations.

FIG. 6 illustrates an embodiment of a RCA frame transmission by a source node 602 and two standby relay nodes 604, 606. The source node 602 and two relay nodes 604, 606 take part in the process of the RCA 620, 622, 624 frame transmission. Note that since the relay nodes have the list, they may calculate the time at which they should transmit the frame even if they cannot hear relayed RCA frames from the other relay nodes. Source node 602 transmits RCA 620. After SIFS 610, relay node 604 transmits RCA 622. After SIFS 612 relay node 606 transmits RCA 624.

The RCA may include information related to the duration of communication or the maximum lifetime of the link in the absence of communication as well as information related to periodic tuning of the beamforming between relay nodes and the node pair. Additionally, the RCA frame may include any other information elements regarding the upcoming communications, e.g., one or multiple Relay Transfer Parameter elements that may override timing parameters, etc.

The RCA frame can be transmitted (quasi-) omni-directionally, or the transmission can be directional to one or more specific directions that allow the destination node and the relay nodes to receive the frame. If the frame is transmitted within an SP, it should reach all the SRSs that have an established link with the node pair as they will otherwise stay awake for the whole duration of the SP. If the frame is transmitted within a TXOP, it is sufficient that the frame reaches the SRSs that are requested to participate in communications.

With respect to communication rules, the RCA frame transmitted by the source STA, possibly followed by RCA frames transmitted by relay nodes, marks the start of the Link Change Interval and, if applicable, the First Period. Then, STAs communicate as follows, based on the operation mode (normal mode or alternation mode), relay link type (link-switching type or link-cooperating type), and the relay type (FD-AF relay or HD-DF relay):

For a Normal Mode, Link Switching Type, FD-AF Relay, all the FD-AF SRSs listed in the RCA frame participate in amplify-and-forward relay communication between the STA pair.

For a Normal Mode, Link Switching Type, HD-DF Relay, all the listed SRSs listen to the source node. The source node starts transmitting frames to a relay node from the announced list according to a rule known to the destination node and the relay nodes. For instance, the SRS list may be a sorted list from which the first relay node is selected first, the second SRS is selected next, and so on. Whenever communication with a relay node is disrupted, the source node switches to another relay node in the list, according to rules known to the destination node and the relay nodes, at the beginning of the following Link Change Interval. An entry in the list, for instance equal to the address of the source node, could indicate direct communication from the source node to the destination node. Provided that the destination node has received an RCA frame, it knows which relay node it has to listen to because it has the list of relay nodes and the timing parameters associated with communication through each relay nodes.

In the case that there may be ambiguities in the timings of switching between the relay nodes, the destination node may listen, for example, (quasi-) omni-directionally or towards the set of relay nodes that may be participating in relay communications. Since the receive gain with an omni-directional antenna configuration may be lower than that with a directional antenna configuration, the relay node may optionally choose to start its communications with the destination node with a low-rate frame such as a request-to-send (RTS) frame. In this case, the destination node will respond, for example, with a clear-to-send (CTS) frame and configure its antenna towards the particular relay node for receiving data frames. If the destination node has failed to receive one or more RCA frames, it could adapt its beam-forming to listen to one or several relay nodes from a prior communication. If the connectivity is lost for a longer period of time, for instance the maximum lifetime of the link, the destination node could send a frame to the AP/PCP to inform it about the failure.

For a Normal Mode, Link Cooperating Type, all the (link cooperating type) listed SRSs relay in the Second Period simultaneously. Note that timing synchronization with different SRSs should have been performed, for example, through separate TPA procedures.

In Alternation Mode, communications start in the first Link Change Interval with communication through the first link (either the direct link or the relay link) specified by the first entry in the relay node list; the source node, then, switches to the second relay in the list for communications in the second Link Change Interval; and so on. Once the source node reaches the end of the list, it returns to the first entry of the list.

If, at any time, the source node discovers that there is an insufficient number of relay nodes for reliable communications, it can perform relay discovery followed by RLS procedures with other relay-capable nodes as relay nodes.

Transmission of the RCA frame allows the source node to request relay communications when it obtains a TXOP. Availability of each relay node during CBAPs can be negotiated during the RLS phase. For instance, an 8 reserved bits in a Relay Capability element can be used for this purpose. A new field, called CBAP Availability, will indicate whether the source node can request this relay node to participate in communication during CBAPs. This field can be used as a relay selection criterion.

Figure 7:
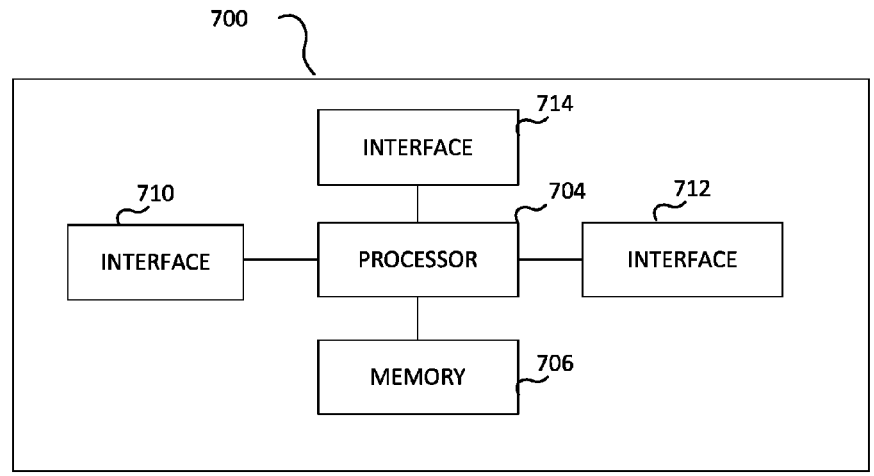
FIG. 7 illustrates a block diagram of an embodiment processing system for performing methods described herein.

FIG. 7 illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in the figure. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to inter-act/communicate with the processing system 700. The processing system 700 may include additional components not depicted in the figure, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smart watch, etc.), or any other device adapted to access a telecommunications network.

In some embodiments, one or more of the interfaces 710, 712, 714 connects the processing system 700 to a transceiver adapted to transmit and receive signaling over the telecommunications network.

Figure 8:
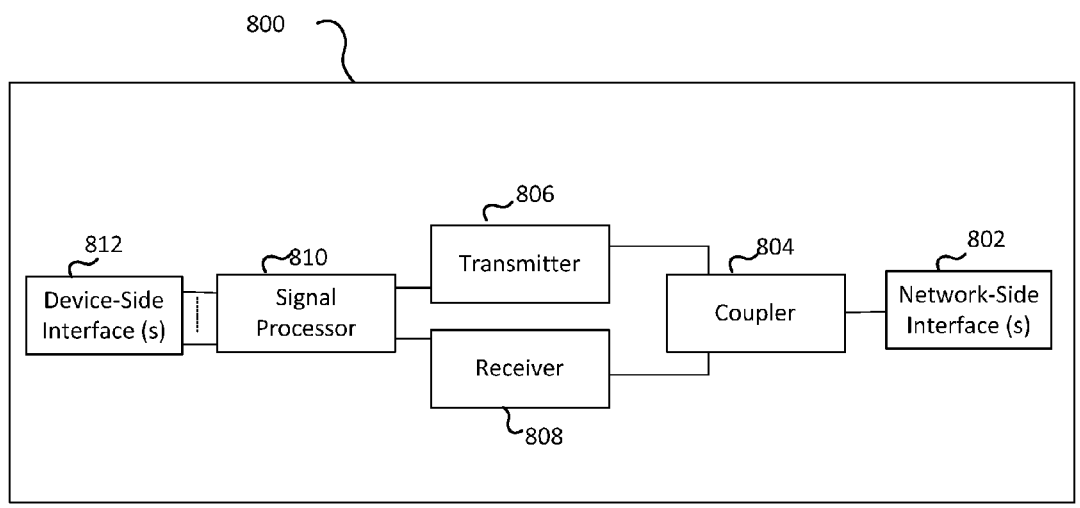
FIG. 8 illustrates a block diagram of a transceiver adapted to transmit and receive signaling over a telecommunication network.

FIG. 8 illustrates a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bidirectional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In some embodiments, a field programmable grid array (FPGA) or similar hardware is programmed with non-volatile instructions used to perform the functions of the processor described above. The FPGA may be used to perform any of the functions above, and contains instructions to be executed that can construct the backup relay links respond to a failure of a relay link by the selection of a backup relay link. The FPGA may operate with embedded memory or with memory located outside of the FPGA. In addition, the FPGA may use other electronic structures or means including network controllers, storage devices, or other electronic components.

An embodiment of a method for relay communication is provided: setting up, by a source node, one or more backup relay links between the source node and a destination node that comprises a route through one or more standby relay nodes; transmitting a first frame, by the source node, to the one or more standby relay nodes to activate the one or more standby relay nodes, wherein the first frame comprises one or more addresses for each of the one or more standby relay nodes, an order in which the one or more standby relay nodes are to be used for the relay communication, and instructions for the one or more standby relay nodes to become one or more active relay nodes; transmitting a second frame from the source node to the destination node informing the destination node of a switch of the relay link, wherein the second frame comprises one or more addresses of the one or more active relay nodes for the destination node to communicate with; establishing, by the source node, a communication path to the destination node using the one or more active relay nodes.

A relay link to be set up can also be described as to be created, or selected, or configurated. The way to have a relay link should be covered by the scope of the application.

A relay link can also be a relay direction, a relay beamform link, a relay path, or a relay communication.

A communication path can also be a communication link or a communication connectivity.

In directional communication, such as being described in standard document of IEEE 802.11ad, the setup of a communication link requires a beam discovery and beam selection procedure prior to the data exchange. Having multiple standby relays provide spatial diversity, such that when a link is blocked other links remain suitable for communication. Spatial diversity is achieved when the standby relays are located in different transmit/receive directions with respect to the source and destination node.

If the source node and destination node cannot directly communicate, they may use a timer to calculate a timeout to determine that one or more relay links is not available anymore, and then they may use a pre-agreed set of relay links to replace the one or more unavailable ones.

Optionally, either or both of above mentioned method may further include that the one or more standby relay nodes goes into sleep mode for the rest of a service period when receiving the second frame indicating the one or more standby relay nodes is not needed for the relay communication in the service period. Sleep mode may have the meaning of working under a low power mode to save energy, or no power at all.

Optionally the relay nodes could provide relay functionality to different source/destination pairs rather than going to low power mode. In this way the exiting relays are reused to provide spatial diversity with a higher efficiency.

Optionally, any one or more of above mentioned method may further include that the second frame is a control frame to be transmitted using a control modulation and coding scheme that is transmitted at a rate below that of which the first frame is transmitted.

Optionally, any one or more of above mentioned method may further include: obtaining a list of the one or more standby relay nodes before transmitting the first frame, and selecting the one or more standby relay nodes from the list to participate the relay communication.

Optionally, any one or more of above mentioned method may further include: communicating capabilities of the one or more standby relay nodes to a control point in the wireless network through a management frame before setting up the one or more backup relay links. Optionally, the management frame is transmitted prior to the first frame. Optionally, the control point is an access point.

Optionally, any one or more of above mentioned method may further include that the first frame is a management frame.

Optionally, any one or more of above mentioned method may further include that the second frame contains an indication showing a beamforming is a mode of an operation of the relay communication.

The method provides redundancy or multiple paths selection in communication paths. Only the nodes that are used to be powered which can conserve power for the network. By providing multiple paths for the data communication, security is also enhanced to prevent for example man-in-the-middle attacks. By providing multiple paths that could be used simultaneously, diversity is achieved which increases the robustness of transmission. For instance diversity due to spatial diversity, network coding, etc.

The method may be carried out in a wireless network. The method may further include: determining that one or more relay nodes is unavailable or unreachable and retrying the first one or more of the standby relay nodes in the order in which the one or more standby relay nodes are to be used for the relay communication.

An embodiment of an apparatus for relay communication is provided: a memory that stores one or more backup relay links between a source node and a destination node that comprises a route through one or more standby relay nodes; a transmitter that transmits a first frame to the one or more standby relay nodes to activate the one or more standby relay nodes that comprises one or more addresses for each of the one or more standby relay nodes, an order in which the one or more standby relay nodes are to be used for the relay communication, and instructions for the one or more standby relay nodes to become one or more active relay nodes and that transmits a second frame from the source node to the destination node informing the destination node of a switch of the relay link, wherein the second frame comprises one or more addresses of the one or more active relay nodes for the destination node to communicate with; and a processor that is used to establish a communication path to the destination node using the one or more active relay nodes.

The above apparatus may further include that the processor determines that one or more of the standby relay nodes is unavailable and retries the first one or more of the standby relay nodes in the order in which the one or more relay nodes are to be used for the relay communication.

Either or both of above mentioned apparatus may further include that the one or more standby relay nodes goes into sleep mode for the rest of a service period, or moves to assist different source and destination pairs, when receiving the second frame indicating the one or more standby relay nodes is not needed for the relay communication in the service period.

Optionally, any one or more of above mentioned apparatus may further include that the second frame is a control frame to be transmitted using a control modulation and coding scheme that is transmitted at a rate below that of which the first frame is transmitted.

Optionally, any one or more of above mentioned apparatus may further include a receiver that obtains a list of the one or more standby relay nodes before transmitting the first frame and selects the one or more standby relay nodes from the list to participate the relay communication.

Optionally, any one or more of above mentioned apparatus may further include the processor further communicates the capabilities of the one or more standby relay nodes to a control point in the wireless network through a management frame before setting up the one or more backup relay link. Alternatively, the management frame is transmitted prior to the first frame. Alternatively, the control point is an access point.

Optionally, any one or more of above mentioned apparatus may further include that the first frame is a management frame.

Optionally, any one or more of above mentioned apparatus may further include that the second frame contains an indication showing a beamforming is a mode of an operation of the relay communication.

Optionally, the method further includes executing the beamforming operation before data exchange at the setting up of the relay links.

Optionally, the second frame contains an indication showing a beamforming is a mode of an operation of the relay communication, and the method may further include executing the beamforming operation prior to data exchange when the one or more standby relay nodes becomes one or more active relay nodes.

Optionally, wherein directional communication is used for the relay communication.

Various embodiments are described furthermore as the follows. Any one or more of above described methods and apparatuses may further include one or more below described various embodiments.

In an embodiment, an apparatus for relay communication that includes a storage means that stores one or more backup relay links between a source node and a destination node that comprises a route through one or more standby relay nodes, a transmitting means that transmits a first frame to the one or more standby relay nodes to activate the one or more standby relay nodes that comprises one or more addresses for each of the one or more standby relay nodes, an order in which the one or more standby relay nodes are to be used for the relay communication, and instructions for the one or more standby relay nodes to become one or more active relay nodes, and that transmits a second frame from the source node to the destination node informing the destination node of a switch of the relay link, wherein the second frame comprises one or more addresses of the one or more active relay nodes for the destination node to communicate with and a processing means that selects a communication path to the destination node using the one or more active relay nodes.

The storage means that stores the one or more backup relay links may also store such as identity of the relays, direction of beamforming, battery status or other status associated with those relays, and those information which might be previously communicated by the relays.

The above apparatus may further include that the processing means determines that one or more of the standby relay nodes is unavailable and retries the first one or more of the standby relay nodes in the order in which the one or more relay nodes are to be used for the relay communication.

Either or both of above mentioned apparatus may further include that the one or more standby relay nodes goes into sleep mode for the rest of a service period when receiving the second frame indicating the one or more standby relay nodes is not needed for the relay communication in the service period.

Optionally, any one or more of above mentioned apparatus may further include that the second frame is a control frame to be transmitted using a control modulation and coding scheme that is transmitted at a rate below that of which the first frame is transmitted.

Optionally, any one or more of above mentioned apparatus may further include a receiving means that obtains a list of the one or more standby relay nodes before transmitting the first frame and selects the one or more standby relay nodes from the list to participate the relay communication.

Optionally, any one or more of above mentioned apparatus may further include the processing means further communicates the capabilities of the one or more standby relay nodes to a control point in the wireless network through a management frame before setting up the one or more backup relay links. Alternatively, the management frame is transmitted prior to the first frame. Alternatively, the control point is an access point.

Optionally, any one or more of above mentioned apparatus may further include that the first frame is a management frame.

Optionally, any one or more of above mentioned apparatus may further include that the second frame contains an indication showing a beamforming is a mode of an operation of the relay communication.

Optionally the beamforming operation is executed before data exchange at the setting up of the relay links.

Optionally the second frame contains an indication showing a beamforming is a mode of an operation of the relay communication, and optionally, the beamforming operation is executed prior to data exchange when the one or more standby relay nodes becomes one or more active relay nodes.

Optionally the directional communication is used for the relay communication.

Various embodiments are described furthermore as the follows. Below embodiments of apparatus are provided either from an aspect of a relay node, or from a destination node, any one or more of above described methods and apparatuses can further be combined with any one of below embodiments of apparatus to form various embodiments to achieve the goal of the present invention.

An apparatus for relay communication includes a memory that stores one or more backup relay links between a source node and a destination node that comprises a route through one or more standby relay nodes; a receiver that receives a first frame that comprises addresses for each of the one or more standby relay nodes, and instructions for the one or more standby relay nodes to become one or more active relay nodes, and receives a second frame from the source node being informed a switch of the relay link, wherein the second frame comprises one or more addresses of the one or more active relay nodes for the destination node to communicate with; and a processor that is used to establish a communication path to the source node using the one or more active relay nodes.

An apparatus for relay communication includes a memory that stores one or more backup relay links between a source node and a destination node that comprises a route through one or more standby relay nodes; a receiver that receives a first frame on the one or more standby relay nodes to activate the one or more standby relay nodes that comprises one or more addresses for each of the one or more standby relay nodes, an order in which the one or more standby relay nodes are to be used for the relay communication, and instructions for the one or more standby relay nodes to become one or more active relay nodes and that receives a second frame from the source node to the destination node informing the destination node of a switch of the relay link, wherein the second frame comprises one or more addresses of the one or more active relay nodes for the destination node to communicate with; and a processor that is used to establish a communication path to the source node using the one or more active relay nodes.

Standards such as IEEE 802.11ad introduce the notion of relays. However, a fast link recovery solution is still needed to provide when the wireless communication links with relays are disrupted or blocked.

The following references are related to subject matter of the present application. Each of these references is incorporated herein by reference in its entirety:

[1] IEEE Draft Standard for Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," IEEE P802.11ad/D7.0, April 2012 (Draft Amendment based on IEEE 802.11-2012), pp. 1-661, Apr. 28, 2012.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for relay communication comprising:
   transmitting, by a source node in a wireless network, a first frame to a plurality of relay nodes in the wireless network, the first frame setting up a plurality of backup relay links between the source node and a destination node in the wireless network, the plurality of relay nodes being initially in standby mode;
   transmitting, by the source node, a second frame to the destination node and to each relay node, the second frame comprising addresses for each relay node used in the plurality of backup relay links, an order in which each relay node is to be used in response to a switch of a relay link, and instructions for each relay node to become an active relay node in response to the switch of the relay link;
   establishing, by the source node, a first communication path to the destination node using a first relay link of the plurality of backup relay links;
   establishing, by the source node, a second communication path to the destination node using a second relay link of the plurality of backup relay links in accordance with the second frame and in response to a disruption in the first communication path; and
   establishing, by the source node, a third communication path to the destination node using a third relay link of the plurality of backup relay links in accordance with the second frame and in response to determining that a relay node in the second relay link is unavailable.

2. The method of claim 1, wherein a corresponding relay node goes into sleep mode for a duration of a service period in response to the corresponding relay node not being needed for the relay communication in the service period.

3. The method of claim 1, wherein the second frame is a control frame to be transmitted using a control modulation and coding scheme that is transmitted at a rate below that of which the first frame is transmitted.

4. The method of claim 1, further comprising:
   receiving a list of relay nodes in the wireless network before transmitting the first frame; and
   selecting the plurality of relay nodes from the list of relay nodes to participate in the relay communication.

5. The method of claim 1, wherein the first frame is a management frame.

6. The method of claim 1, wherein the second frame contains an indication showing a beamforming is a mode of an operation of the relay communication, and the method further comprising: executing a beamforming operation before data exchange at setting up the plurality of backup relay links.

7. The method of claim 1, wherein the second frame contains an indication showing a beamforming is a mode of an operation of the relay communication, and the method further comprising: executing a beamforming operation prior to data exchange in response to a relay node becoming an active relay node.

8. The method of claim 1, wherein directional communication is used for the relay communication.

9. The method of claim 1, further comprising:
   communicating capabilities of the plurality of relay nodes to a control point in the wireless network through a management frame before setting up the plurality of backup relay links.

10. The method of claim 9, wherein the management frame is transmitted prior to the first frame.

11. The method of claim 10, wherein the control point is an access point.

12. An apparatus for relay communication comprising:
    a transmitter;
    a non-transitory memory storage comprising instructions, the non-transitory memory storage configured to store a configuration of a plurality of backup relay links between a source node and a destination node in a wireless network, a plurality of relay nodes being initially in standby mode;
    a processor in communication with the transmitter and the non-transitory memory storage, wherein the processor executes the instructions to:
       transmit a first frame to the plurality of relay nodes in the wireless network, the first frame setting up the plurality of backup relay links;
       transmit, using a control modulation and coding scheme, a second frame to the destination node and to each relay node, the second frame being a control frame transmitted at a rate below that of which the first frame is transmitted, the second frame comprising addresses for each relay node used in the plurality of backup relay links, an order in which each relay node is to be used in response to a switch of a relay link, and instructions for each relay node to become an active relay node in response to the switch of the relay link;

establishing a first communication path to the destination node using a first relay link of the plurality of backup relay links; and establishing a second communication path to the destination node using a second relay link of the plurality of backup relay links in accordance with the second frame and in response to a disruption in the first communication path.

13. The apparatus of claim 12, wherein the processor executes the instructions to establish a third communication path to the destination node using a third relay link of the plurality of backup relay links in accordance with the second frame and in response to determining that a relay node in the second relay link is unavailable.

14. The apparatus of claim 12, wherein a corresponding relay node goes into sleep mode for a duration of a service period in response to the corresponding relay node is not being needed for the relay communication in the service period.

15. The apparatus of claim 12, wherein the apparatus further comprises a receiver in communication with the processor, the processor executes the instructions to:
receive a list of relay nodes in the wireless network before transmitting the first frame; and
select the plurality of relay nodes from the list of relay nodes to participate in the relay communication.

16. The apparatus of claim 12, wherein the first frame is a management frame.

17. The apparatus of claim 12, wherein the second frame contains an indication showing a beamforming is a mode of an operation of the relay communication.

18. The apparatus of claim 12, wherein the second frame contains an indication showing a beamforming is a mode of an operation of the relay communication, and wherein the processor executes the instructions to execute a beamforming operation before data exchange and before setting up the plurality of backup relay links.

19. The apparatus of claim 12, wherein the second frame contains an indication showing a beamforming is a mode of an operation of the relay communication, and wherein the processor executes the instructions to execute a beamforming operation prior to data exchange in response to a relay node becoming an active relay node.

20. The apparatus of claim 12, wherein directional communication is used for the relay communication.

21. The apparatus of claim 12, wherein the processor executes the instructions to transmit capabilities of the plurality of relay nodes to a control point in the wireless network through a management frame before setting up the plurality of backup relay links.

22. The apparatus of claim 21, wherein the management frame is transmitted prior to the first frame.

23. The apparatus of claim 22, wherein the control point is an access point.

24. An apparatus for relay communication comprising:
a receiver;
a non-transitory memory storage comprising instructions;
a processor in communication with the receiver and the non-transitory memory storage, wherein the processor executes the instructions to:
receive a first frame to setup the apparatus as a relay node in one or more relay links of a plurality of backup relay links between a source node and a destination node in a wireless network;
receive a second frame comprising addresses for each relay node used in the plurality of backup relay links, and instructions to become an active relay node in response to a switch of a relay link, the second frame containing an indication showing a beamforming is a mode of an operation for relay communication; and
execute a beamforming operation before data exchange and before setting the apparatus as a relay node.

25. The apparatus of claim 24, wherein a corresponding relay node goes into sleep mode for a duration of a service period in response to the corresponding relay node not being needed for relay communication in the service period.

26. An apparatus for relay communication comprising:
a receiver;
a non-transitory memory storage comprising instructions;
a processor in communication with the receiver and the non-transitory memory storage, wherein the processor executes the instructions to:
receive a first frame to setup the apparatus as a relay node in one or more relay links of a plurality of backup relay links between a source node and a destination node in a wireless network;
receive a second frame comprising addresses for each relay node used in the plurality of backup relay links, an order in which each relay node is to be used in response to a switch of a relay link, and instructions to become an active relay node in response to the switch of the relay link, the second frame containing an indication showing a beamforming is a mode of operation for relay communication; and
executing a beamforming operation prior to data exchange in response to a relay node becoming an active relay node.

27. The apparatus of claim 26, wherein a corresponding relay node goes into sleep mode for a duration of a service period in response to the corresponding relay node not being needed for relay communication in the service period.

* * * * *

UNITED STATES PATENT AND TRADEMARK OFFICE
CERTIFICATE OF CORRECTION

PATENT NO. : 10,230,448 B2
APPLICATION NO. : 15/222907
DATED : March 12, 2019
INVENTOR(S) : George Calcev et al.

It is certified that error appears in the above-identified patent and that said Letters Patent is hereby corrected as shown below:

In the Claims

In Column 17, Line 20, Claim 14, delete "node is not" and insert --node not--.

In Column 17, Line 21, Claim 14, delete "needed for the relay communication" and insert --needed for relay communication--.

Signed and Sealed this
Second Day of July, 2019

Andrei Iancu
*Director of the United States Patent and Trademark Office*